(No Model.)
A. P. CLEMENTS.
CURRY COMB.
No. 441,136. Patented Nov. 25, 1890.
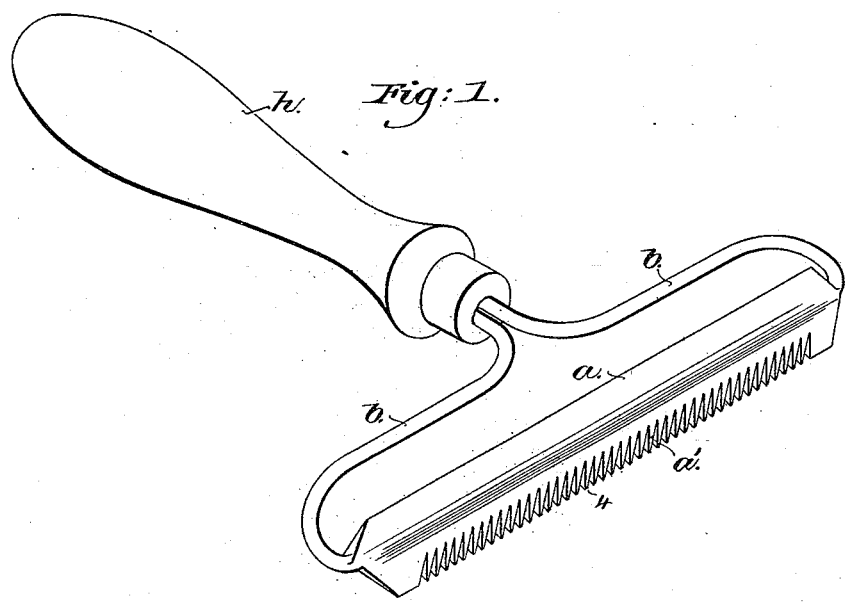
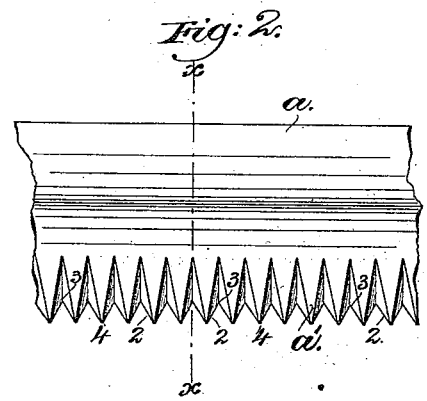
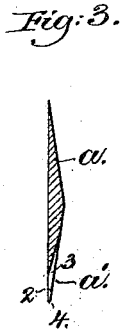
Witnesses.
Frederick L. Emery
Geo. C. Hunting
Inventor.
Albion P. Clements,
by Crosby & Gregory
Attys.

UNITED STATES PATENT OFFICE.

ALBION P. CLEMENTS, OF WINTERPORT, MAINE.

CURRY-COMB.

SPECIFICATION forming part of Letters Patent No. 441,136, dated November 25, 1890.

Application filed April 11, 1890. Serial No. 347,438. (No model.)

*To all whom it may concern:*

Be it known that I, ALBION P. CLEMENTS, of Winterport, county of Waldo, State of Maine, have invented an Improvement in Curry-Combs, of which the following description, in connection with the accompanying drawings, is a specification, like letters on the drawings representing like parts.

This invention has for its object to provide a curry-comb which will more effectually remove loose hairs and other foreign matter from the animal to be groomed.

In accordance with this invention a blade of steel or other suitable metal provided with a handle has a series of teeth formed to present substantially sharp sides and roots, while the tops are preferably blunted to avoid scratching the hide.

My invention therefore consists in the combination, with a handle, of a blade having teeth the sides and roots of which are formed to present substantially sharp edges, substantially as will be described.

Other features of my invention will be hereinafter described, and pointed out in the claim at the end of this specification.

Figure 1 is a perspective view of my improved curry-comb; Fig. 2, an enlarged detail of a portion of the blade, showing the shape of the teeth; and Fig. 3, a cross-section on the dotted line $x$ $x$, Fig. 2.

Referring to the drawings, the blade $a$, of convenient length and preferably straight, is herein shown as having its front face beveled in opposite directions, (shown best in Fig. 3,) and the said blade is provided at its ends with suitable bows $b$, bent backward and together to form a shank for the handle $h$, as shown. The blade $a$ has formed upon one edge a series of teeth $a'$, (herein shown as cut on a bevel to present substantially sharp sides 2 and roots 3,) while the tops 4 are preferably blunted, as shown, to prevent scratching the hide. The sides and roots of the teeth being sharp will take hold of and remove loose hairs and other foreign matter much more readily than if the sides and roots were dull, as in curry-combs as at present constructed. I preferably employ a blade beveled in opposite directions, as shown, in order to secure greater thickness and correspondingly-increased strength; but the same may be made of uniform thickness throughout, if desired.

I have herein shown the blade as provided with teeth upon one edge only, the other edge being left in suitable condition to be used as a scraper; but, if desired, the said blade may be provided with teeth upon both edges.

I do not desire to limit myself to the particular method shown for making the sides and roots of the teeth sharp, as any other means may be used for forming the teeth to present substantially sharp edges upon the sides and roots in contradistinction from teeth cut squarely through from one side to the other.

It is evident the bows $b$ may be formed into a handle without using the separate handle $h$, if desired.

I claim—

The blade $a$, the teeth $a'$, formed upon one edge and having substantially sharp sides 2 and roots 3, with blunted tops 4, combined with the bows $b$, formed integral with the blade $a$, and the handle $h$, substantially as described.

In testimony whereof I have signed my name to this specification in the presence of two subscribing witnesses.

ALBION P. CLEMENTS.

Witnesses:
F. W. RITCHIE,
ALONZO F. BATCHELDER.